US006556975B1

(12) United States Patent  (10) Patent No.: US 6,556,975 B1
Wittsche  (45) Date of Patent: Apr. 29, 2003

(54) COMPUTER SYSTEM AND METHOD FOR PROVIDING AN ON-LINE MALL

(76) Inventor: L. William Wittsche, 1507 Persimmon Ct., Allen, TX (US) 75002

( * ) Notice: Subject to any disclaimer, the term of this patent is extended or adjusted under 35 U.S.C. 154(b) by 0 days.

(21) Appl. No.: 09/428,741

(22) Filed: Oct. 28, 1999

(51) Int. Cl.[7] .............................................. G06F 17/60
(52) U.S. Cl. ............................ 705/26; 705/27; 705/14
(58) Field of Search ............................. 705/26, 27, 14

(56) References Cited

U.S. PATENT DOCUMENTS

| | | | | |
|---|---|---|---|---|
| 4,992,940 A | * | 2/1991 | Dworkin ..................... 235/383 |
| 5,208,665 A | * | 5/1993 | McCalley et al. .......... 725/114 |
| 5,710,887 A | * | 1/1998 | Chelliah et al. ............ 345/835 |
| 5,754,981 A | * | 5/1998 | Veeneman et al. ............ 705/26 |
| 6,125,353 A | * | 9/2000 | Yagasaki ..................... 705/27 |
| 2001/0011239 A1 | * | 8/2001 | Kondoh et al. ............... 705/27 |
| 2001/0014868 A1 | * | 8/2001 | Herz et al. .................... 705/14 |

FOREIGN PATENT DOCUMENTS

| | | | | |
|---|---|---|---|---|
| JP | 410105829 A | * | 4/1998 | ........... G07F/17/40 |
| JP | 410162062 A | * | 6/1998 | ........... G06F/17/60 |

OTHER PUBLICATIONS

) Press Release, Free Wedding Planning Products Guide Through the Process High–Tech Help for Those Saying 'I Do', PR Newswire, Denver, Dec. 9, 1997, extracted on Internet from Dialog File 813 on 04.01/2002.*

Hayes, Heather B, "The DLA E–Mall", Air Force times, Jul. 20, 1998, vol. 58 Issue 50, DoD IT p12, 1p, 1c extracted on Internet from "Corporate Resource Net" Database on Sep. 20, 2001.*

Sandberg, Jared; Stone, Brad, "The Electronic Mall", Newsweek, Winter 98 Special issue Extra, p10, 6p, 9c.*

). Hayes, Heather B, "The DLA E–Mall", Air Force times, Jul. 20, 1998, vol. 58 Issue 50, DoD IT p12, 1p, 1c.*

* cited by examiner

Primary Examiner—Wynn Coggins
Assistant Examiner—Y. C. Garg
(74) Attorney, Agent, or Firm—Christopher J. Rourk; Akin, Gump, Strauss, Hauer & Feld, LLP

(57) ABSTRACT

A computer system and method for providing an on-line mall. An on-line mall environment is provided. The on-line mall environment is partitioned into at least one community and having at least one store in each community. Each store is made available to a merchant to occupy. The merchant may customize the store by providing for storage on the on-line mall sight design data and merchandise data. Customers access the on-line mall through a remote location. The customers may connect with the on-line mall website through direct connection to the on-line mall or through links provided by other websites. Customer specific data is stored on the on-line mall allowing the customer to enter purchasing data one time for the many stores in each community. Customer purchasing selections are stored and submitted to the mechant on standard intervals.

24 Claims, 11 Drawing Sheets

COMPUTER SYSTEM AND METHOD FOR PROVIDING AN ON-LINE MALL

FIELD OF THE INVENTION

The field of the invention relates to providing an on-line mall. More particularly, the invention relates to providing a one stop-shopping environment where the customer can make purchases at a variety of merchants at the mall.

BACKGROUND

For many years customers frequented large department stores, such as J.C. Penney or Macy's to purchase the desired merchandise. If the customer desired merchandise not carried by that large retailer, then the customer was required to visit another retailer located at a different site. Entrepreneurs, seeing this phenomenon, proposed that several retailers of both large and small size be contained within one large connected area so that customers could still visit their respective merchants to purchase the merchandise they desired; however, they need only make one trip to purchase their merchandise from multiple retailers. The mall concept has spread throughout the world and malls are now located within virtually all large to medium sized cities or towns. The idea of going to the mall to purchase one's goods still remains one of the most productive ways in which a retailer can place his merchandise in front of the customer.

However, with the creation of the Internet and the increasing customer access to the Internet, merchants have begun to place stores on-line in which a customer may access the retailers store from the comfort of his own home and view and purchase the merchant's merchandise. Therefore, the customer's travel from his home to the merchant's store has been replaced by electronic travel, using the customer's computer to access the merchant's computer system in which the consumer may visit the merchant's store.

As was required prior to the creation of malls, however, the customer must be aware of each retailer's location and must be aware that the retailer exists so that the customer may access the retailer's specific store. Therefore, any advancement in the ability to place multiple retailers in front of a customer in one location would be advantageous.

SUMMARY OF THE INVENTION

A computer system and method for providing an on-line mall. The on-line mall environment is partitioned into at least one community and having at least one store in each community. Each store is made available to a merchant to occupy. The merchant may customize the store by storing on the on-line mall site both design data and merchandise data. Customers access the on-line mall through a remote location. The customers may connect with the on-line mall website through direct connection to the on-line mall or through links provided by other websites. Customer specific data is stored on the on-line mall allowing the customer to enter purchasing data one time for the many stores in each community. Customer purchasing selections are stored and submitted to the merchant on standard intervals.

BRIEF DESCRIPTION OF THE DRAWINGS

A better understanding of the present invention can be obtained when the following detailed description of one exemplary embodiment is considered in conjunction with the following drawings, in which.

DETAILED DESCRIPTION OF EXEMPLARY EMBODIMENTS

Figure 1:
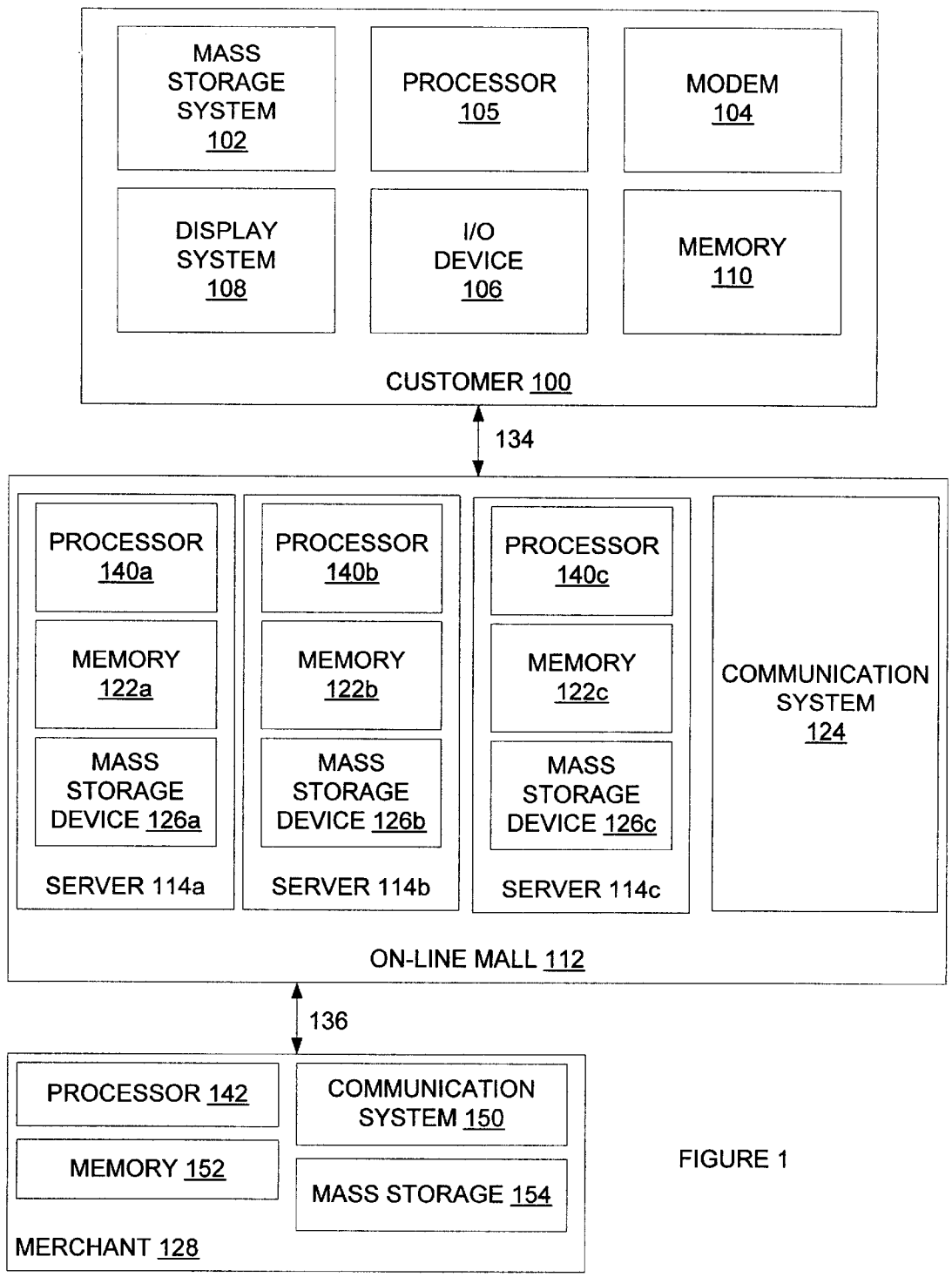
FIG. 1 is a block diagram depicting the computer system according to the invention.

In the description which follows, like parts are marked throughout the specification and drawings with the same reference numerals, respectively. The drawing figures are not necessarily drawn to scale and certain figures may be shown in exaggerated or generalized form in the interest of clarity and conciseness.

FIG. 1 illustrates the block diagram of the computer system according to the present invention. A customer's computer 100 is shown connected with an on-line mall's computer 112. The customer's computer 100 typically includes a mass storage device 102, a modem 104, an I/O device 106, a display system 108, a processor 105, such as the Intel Pentium II, and memory 110. The customer's computer 100 is of the kind generally available to an individual user. Preferably, the customer's computer 100 communicates with the on-line mall's computer 112 from a remote location by way of a communication line 134, such as a standard telephone line or a direct communication line.

The on-line mall's computer 112 includes a communications system 124 and a series of servers 114, namely server 1 114a, server 2 114b, and server 3 114c. Each server includes a memory component 122a, 122b, and 122c and a mass storage system 126a, 126b, and 126c. Server 1 114a, server 2 114b, and server 3 114c are shown; however, multiple servers may be added or removed to the series of servers 114 without detracting from the spirit of the invention. The communications system 124 allows the on-line mall's computer 112 to communicate with the customer's computer 100 or merchant computer 128 using standard Internet communication protocols or other communications protocols as is known in the industry. Preferably, the communications system 124 is implemented with a modem and a standard telephone line or is implemented with a direct communications line; however, a wide variety of communication systems and lines may be implemented without detracting from the spirit of the invention, including, but not limited to DSL, ISDN, and RF. The mass storage system 126 includes mass storage devices such as one of a series of hard disks, an optical disk, or other suitable mass storage media.

Each server, 114a, 114b, and 114c in the on-line mall has access to a processor 140a, 140b and 140c respectively.

Each processor 140*a*, 140*b* and 140*c* may retrieve data from memory 122*a*, 122*b* and 122*c* respectively. The processor 140 may comprise a single processor, which is commonly available to each server 114*a*, 114*b*, and 114*c*, or may include a series of processors. Each processor 140*a*, 140*b* and 140*c* is capable of executing programs, which may be stored in the mass storage system 126*a*, 126*b* and 126*c* respectively or other suitable systems, which, when executed, provide the website that can be viewed by both the merchant and the customer.

The on-line mall's computer 112 communicates with merchant computer 128 through communication line 136. Merchant computer 128 includes a communication device 150, a memory device 152, a mass storage system 154 and a processor 142. The on-line mall's computer 112 may also communicate with multiple merchants computers (not shown), without detracting from the spirit of the invention. The merchant computer 128 is shown in an exemplary manner to present the interaction between the on-line mall's computer 112 and the merchant computer 128 where the merchant computer 128 is one of the multiple computers communicating with the on-line mall's computer 112. Merchant computer 128 includes communication device 150 which are well known to those skilled in the art.

Further, the merchant computer 128 includes a mass storage system 154 which may be comparable to the mass storage system 126 discussed above and is known in the industry. The merchant computer 128 further includes a processor 142. The processor 142 may include a single processor which is commonly available or may include a series of processors or a series of processors integrated in a series of servers which are commonly available.

Figure 2:
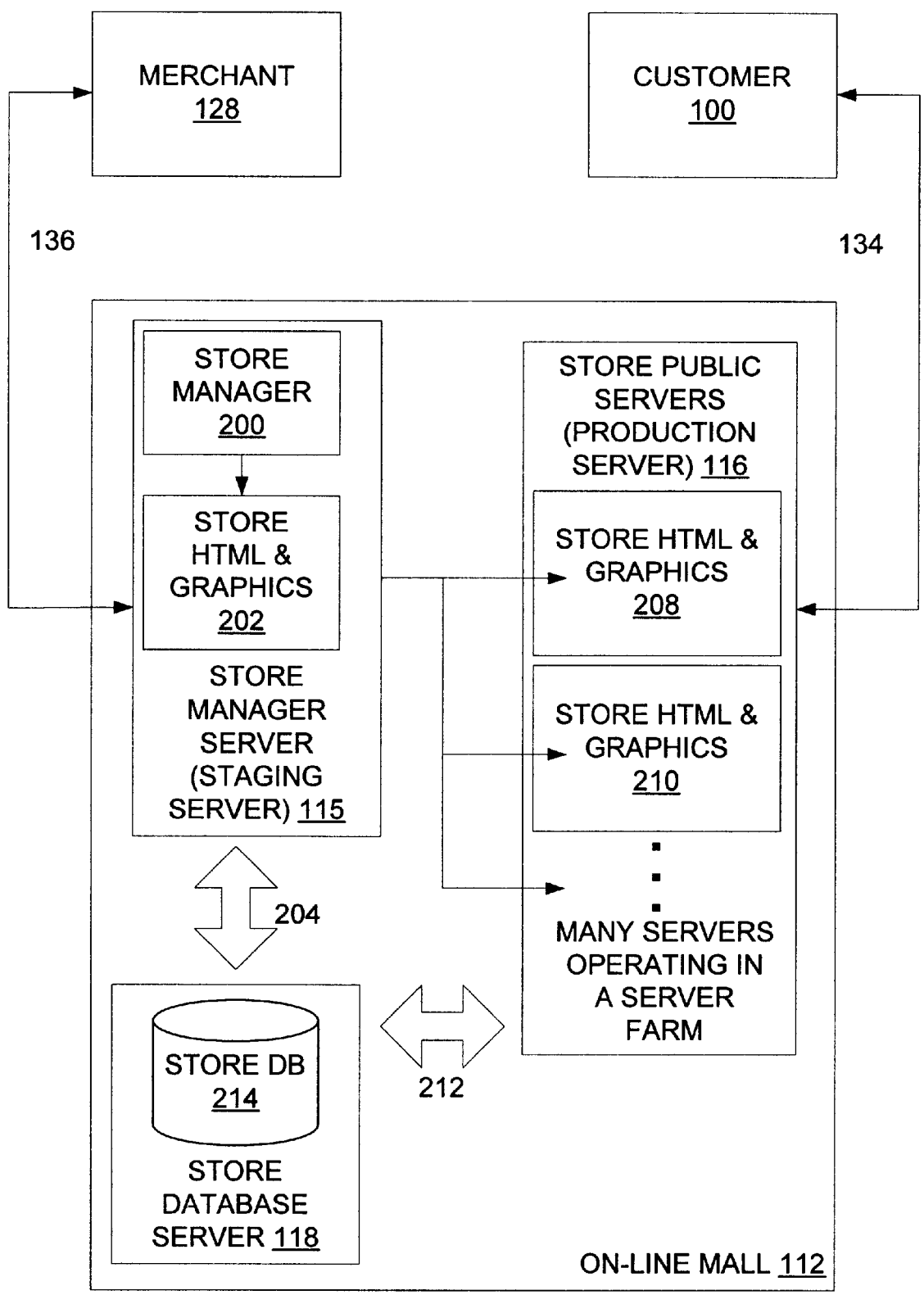
FIG. 2 is a block diagram of the functional distribution of the servers for a specific store according to the invention.

Referring now to FIG. 2, a block diagram of the functional allocation of the servers for each store provided on the on-line mall website 112 is shown. A merchant computer 128 is shown connected to the on-line mall Computer 112 through a communication line 136. The customer's computer 100 is shown connected to the on-line mall Computer 112 through communication line 134.

The on-line mall's computer 112 is partitioned into a series of servers 114. In one disclosed embodiment, the series of servers 114 include a store manager server, a store database server, and a store public server. However, a wide variety of functions may be assigned to each server contained within the series of servers 114 without detracting from the spirit of the invention. The on-line mall's computer 112 may be partitioned into elements which may cross multiple servers.

The on-line mall website is functionally partitioned into communities. For the purposes of this application, a community is a series of stores, which are targeted to a specific demographic market. Examples include, but are not limited to, apparel stores for women, men, children, and teens.

Each community includes a series of stores, each of which is occupied by a merchant. Each merchant provides its own merchandise directed to this community. While each store is functionally tied to a specific community, the store preferably may physically interact with several servers. Thus, as can be seen in FIG. 2, for a specific store, several servers are accessed for single transactions.

A store manager server 115 is provided and includes store manager data 200 and a store manager graphical interface 202. The store manager data 200 includes information such as merchandise available at the store and specific merchandise pricing data. The store manager server 115 is connected through link 204 to the store database server 118. The store database information 214 is contained within the store database server 118. The merchant's computer 128 is connected to the on-line mall computer 112, and more specifically to the store manager server 115 through communication line 136. The store manager server 115 is connected to the store public server 116 through communication line 206. The store database server 118 is also connected to the store public server 116 through communication line 212. Specific store graphical interfaces 208 and 210 are shown contained within store public server 116. The customer's computer 100 is connected to the on-line mall computer 112, and more specifically to the store public server, through communication line 134.

Figure 3:
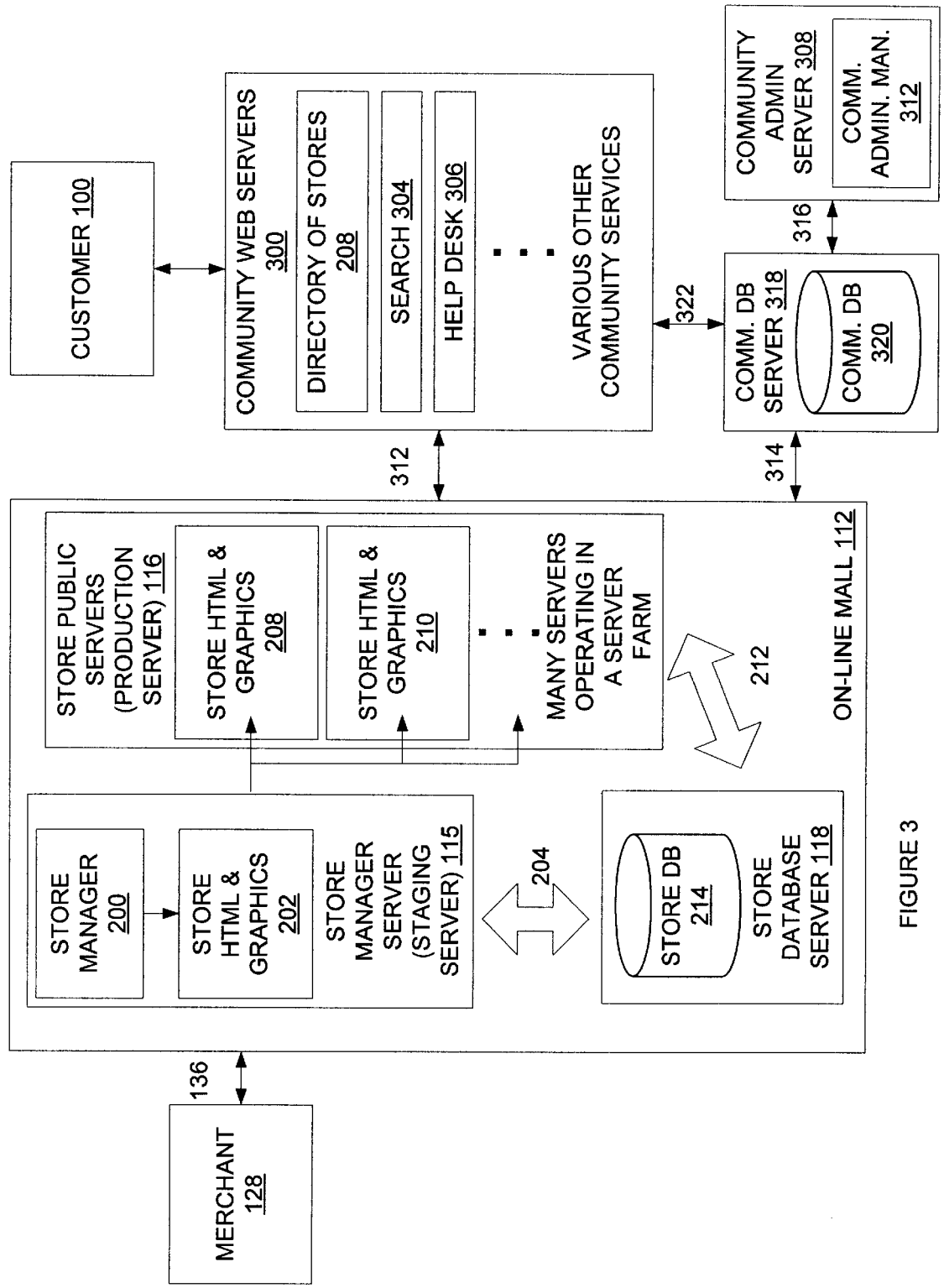
FIG. 3 is a block diagram of the functional distribution of the servers for a community according to the invention.

Referring now to FIG. 3, the functional server allocation for a community is shown. The functional allocation of the on-line mall website for a community accesses several physical servers of the on-line mall computer 112. The merchant's computer 128 communicates with the on-line mall computer 112 through communication line 136. As discussed above in connection with FIG. 2, the merchant's computer 128 communicates with a specific store partitioned within the on-line computer 112. The store public server 116 communicates with the community database server 318 through communication line 314. The community database data 320 is stored within the community database server 318. The community database data 320 includes information such as the gift registry and specific purchase order data. The community database server 318 communicates through communication line 316 with a community administration server 308. The community administration manager 310, which administers the many stores stored within the community, is contained within the community administration server 308. The community database server 318 is further connected through communication line 322 to the community web server 300. The community web server 300 includes several community functions including, by way of example, a directory of all stores 302, search capabilities 304, a help desk 306, and various other community functions. Each specific store can also communicate through line 312 with the community web server 300. Also, the customer's computer 100 communicates through communication line 134 with a community web server 300. Communication lines 314, 316, and 322 may be actual physical communication lines such as copper, fiber optic, or virtual communication lines which connect functional elements within one or multiple servers. Thus, various communication lines may be implemented without detracting from the spirit of the invention.

Figure 4:
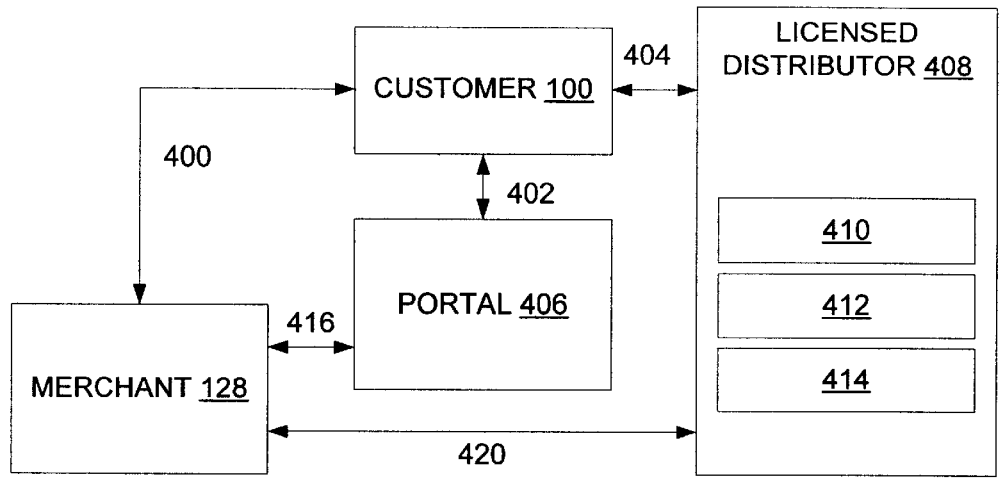
FIG. 4 is a functional diagram of customer on-line purchase options as it was known in the prior art.

Referring now to FIG. 4, a functional diagram of the prior art purchasing methodologies are shown. According to the prior art, the customer's computer 100 is connected through a communication line 400 to a merchant's computer 128. The customer purchases the merchant specific goods directly through the merchant's websites provided through the merchant's computer 128. Alternatively, the customer connects through communication line 402, to a portal 406. The portal 406 provides a hot link from the portal 406, through a communication line 416, to the merchant's computer 128. The customer is transferred from the portal 406 through communication line 416 to merchant's computer 128, where he makes the purchase. Alternatively, the customer communicates, through a communication line 404, with a licensed distributor of the merchant's product 408, not the actual merchant. The licensed distributor's computer 408 includes the merchant's merchandise 410 and other licensed merchandise 412 and 414. The licensed distributor's computer 408 is in communication with the merchant's computer 128 through communication line 420 so as to obtain merchandise from the merchant for the licensed distributor rather than to pass the customer through to the merchant's computer 128. An example of a licensed distributor may include a retail outlet for furniture, wherein the retail outlet purchases the furniture from the manufacturer and then directly sells the furniture to a customer. The customer may access the manufacturer's website 128 and buy directly from the manufacturer, or the customer may access a licensed distributor and purchase the furniture through a licensed distributor 408.

Figure 5:
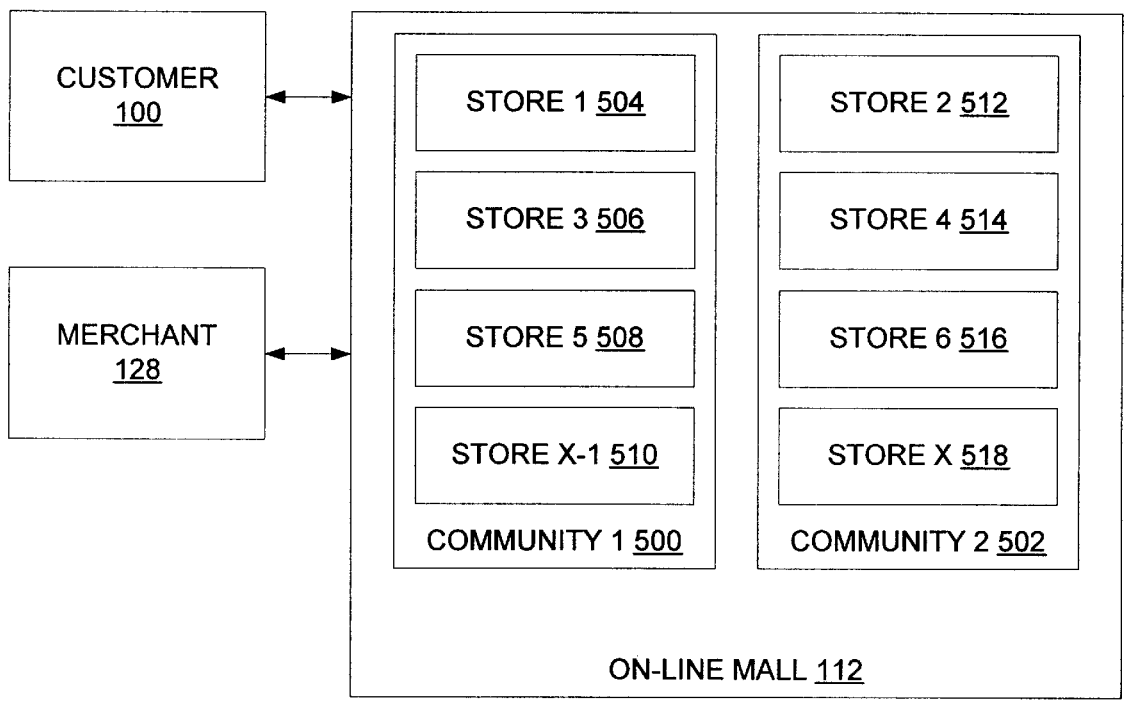
FIG. 5 is a functional diagram of purchase options according to the invention.

Referring now to FIG. 5, a functional diagram of the on-line purchasing system, according to the present invention, is shown. The customer, through the customer's computer 100, is connected to the on-line mall computer 112 through communication line 134. The on-line mall computer 112 is functionally divided into multiple communities with community 1 500 and community 2 502 shown for purpose of illustration. However, those of ordinary skill in the art will recognize that multiple communities or other functional allocations may be used and many such communities are available. Community 1 500 includes multiple stores, including store 1 504, store 3 506, store 5 508, and store x-1 510. Community 2 502 includes store 2 512, store 4 514, store 6 516, and store x 518, where store x is the maximum number of stores available. The customer contacts the on-line mall's computer 112 to obtain access to the on-line mall website. Once the on-line mall website is accessed, the customer selects the community the customer would like to enter. Once the customer has entered a community, the customer has the ability to visit multiple stores and make purchases from multiple merchants. Further, the customer may exit the current community and enter a second community and continue to make purchases.

The purchases are made by selecting an item that the customer desires without having to provide specific purchasing data to the specific merchant at the time the customer exits the current store. For example, the customer may enter store 1 504 and purchase article 1. The customer may then enter store 5 508 and purchase article 2. The customer purchases article 1 and article 2 from stores 1 504 and store 5 508, respectively. By selecting an item from a store's website page, the selected item is then placed in the customer's electronic "shopping cart." The electronic shopping cart stores the selected article for the duration of the customer's visit to the on-line mall website or for access during a later visit to the on-line mall. Thus, the customer may place additional articles in the shopping cart or remove previously selected articles from the shopping cart as the customer enters and exits the various stores and communities on the on-line mall website.

The customer may then leave community 1 500 and enter community 2 502. Once in community 2 502, the customer may enter store 4 514 and select article z. Once the customer has entered all the stores and communities the customer desires, the customer then purchases the selected articles. The selections made by the customer which have been stored in the electronic shopping cart are processed at this time store by store, however, one skilled in the art may process the purchases in a wide variety of manners including processing all purchases from all stores at one time. The customer therefore may only have to provide a single set of payment information, even though the customer has visited and purchased articles from multiple merchants in multiple communities. If the customer does not desire to purchase the selected articles stored in the electronic cart at the end of the customer's visit to the on-line mall, the selected articles may be stored in the electronic shopping cart for later access or changed or deleted as the customer adds articles to the electronic cart from the different merchants. In one embodiment, the electronic shopping cart is stored on the customer's computer and is accessed when the customer reenters the on-line mall. However, one skilled in the art can implement a variety of storing mechanisms in which the electronic shopping cart may store the selected articles including but not limited to storing the selected articles in the electronic shopping cart on the on-line mall's computer while providing an identifier to the customer which accesses the electronic shopping cart once the customer has reentered the on-line mall.

The selected articles for purchase are stored in multiple databases such as the store database server 118 and the community database server 318 (not shown in this figure). A community database records the number of articles purchased, the merchant, and the price. The store's database also records the customer who purchased the article, the article purchased, and the payment information entered by the customer. At a specific interval, the on-line mall's computer 112 communicates with merchant computer 128, through the communication line 136, to transfer the merchant specific purchase request. The merchant computer 128 is shown in exemplary manner, however, multiple merchants may be connected to the on-line mall computer 112 without detracting from the spirit of the invention. The on-line mall computer 112 then sends the specific merchant the purchasing data obtained since the previous update. Therefore, at a specified update period, each merchant receives the purchasing data and invoices since the previous update. The purchasing data entered by the customer when the customer purchases the selected articles is submitted to multiple merchants, therefore, allowing multiple merchants to receive the once entered customer payment information. The interval in which each merchant is updated varies according to merchant or the technology available to a specific merchant. The interval may range from real time updates to monthly updates. Those well skilled in the art will recognize that other suitable update intervals may be provided.

Figure 6:
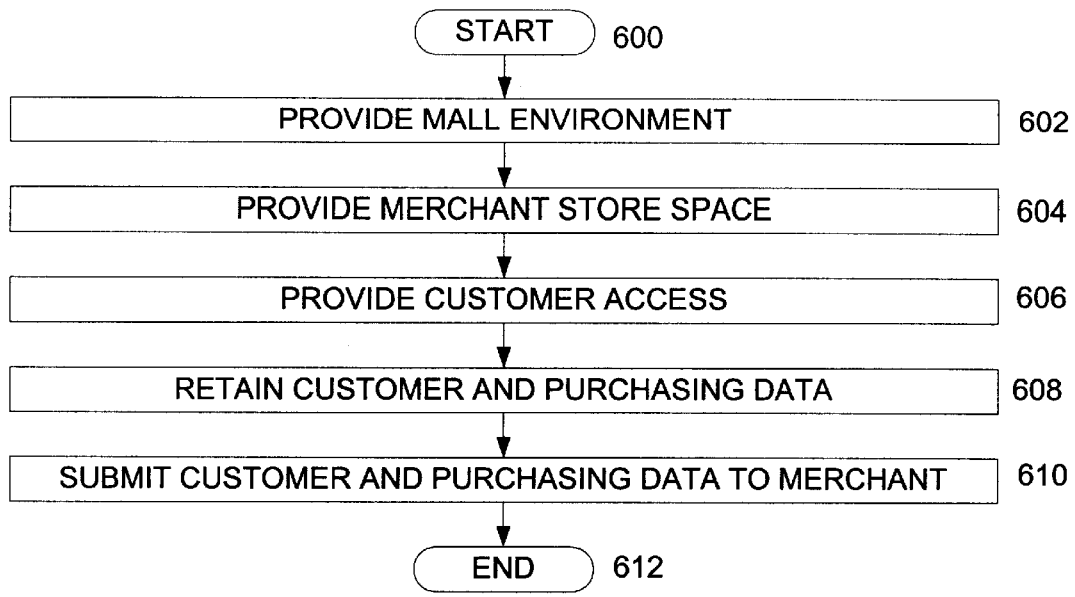
FIG. 6 is a flow diagram of an on-line mall.

Referring now to FIG. 6, a flowchart of the on-line mall process is shown. The process begins with Start 600. Next in step 602, a mall environment is provided. The mall environment includes determining which communities are available, allocating store space in each community, maintaining the customer registry, maintaining discussion groups which are accessible by customers or by merchants, and maintaining data collection formats. Next in step 604, the on-line mall provides merchant store space. Within each community, merchant store space is available to be occupied by specific merchants. Merchants are contacted and allowed to choose one or a multiple of communities in which the merchant would like to participate. The merchant is then allowed to customize the merchant store to fit the merchant's needs. However, a common storefront may be maintained to provide an aesthetic appearance with the other storefronts within the community and within all of the on-line mall website.

The mall environment allows for cooperative multi-merchant interaction within this community retailing system. Cooperative multi-merchant interaction includes by way of example multiple merchants sharing marketing and demographic data and sharing basic on-line tools. This allows for the multiple merchants to work toward a goal while maintaining commonality. The sharing of basic tools includes by way of example implementing a common registration database and providing a common order tracking system.

Next in step 606 customer access is provided to the on-line mall website. Preferably, a customer accesses the on-line mall website through a remote access. Customer access may be provided through a direct connection with the on-line mall website or through a series of hot links from portals or other websites. Further, customer access may be solicited through a mass advertising campaign by the on-line mall in which the on-line mall web address is provided by electronic mail and other media, such as newspapers, or television or radio. Specific merchant merchandise may be advertised through the same media allowing a customer to access the on-line mall to purchase a particular item the customer has learned of from a different media.

Next in step 608, customer data and purchase data are collected and retained. Once the customer has accessed the on-line mall website, data collection commences. Customer data is collected at one point of time, such as after purchases have been selected thus allowing the customer to browse multiple communities and stores and make numerous purchases while entering customer data only once. However, historical data is collected during the on-line mall visit. Such collection includes the monitoring of the customer's visit. For example, if the customer accesses two specific stores in two specific communities, the merchants of such stores may obtain this historical data to help focus the merchant's marketing effort and to influence future entries into certain communities. Further, data concerning any purchases made by the customer during the visit to the on-line mall website or to the particular store or community are collected as the customer selects such purchases. Next in step 610, at a particular interval, purchasing data and merchant specific data are submitted to the merchant. Purchasing data since the previous update are sent to the particular merchant in that stated interval. Further, historical customer data may be sent to the merchant at a separate standard interval. The process ends with Step 612.

Figure 7:
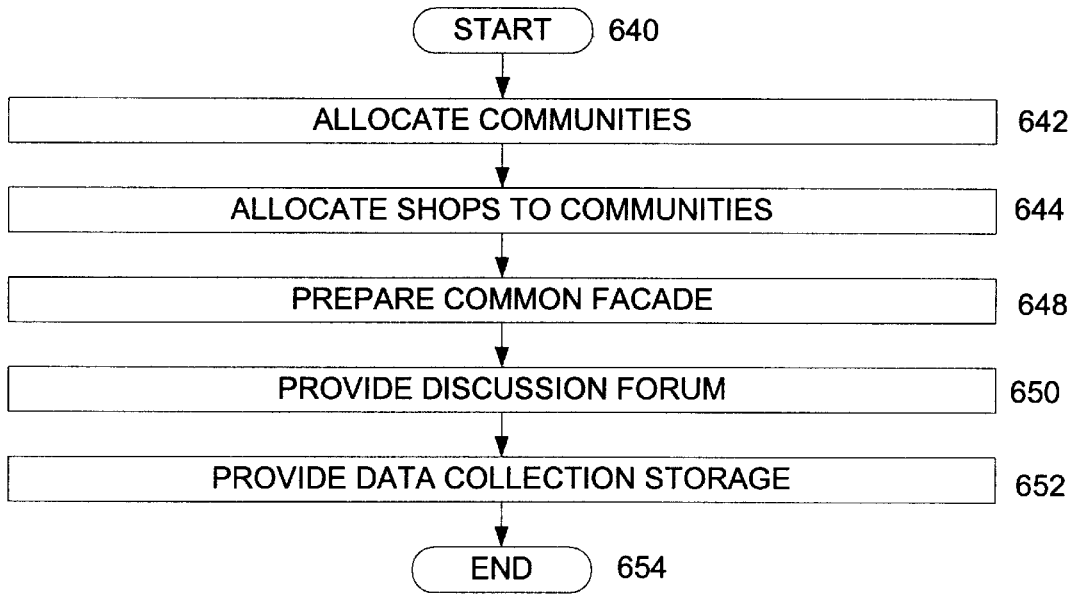
FIG. 7 is a flow diagram of the mall environment element of FIG. 6.

Referring now to FIG. 7, the mall environment process is shown. The process begins with Start 640. Next in step 642, the number and types of communities are allocated. The number and types of communities are established dependant upon marketing data obtained by the on-line mall so as to address specific needs as determined by the on-line mall. Therefore, the number of communities and types of communities may vary over time and may change in number and magnitude. Once the communities are determined, the number of shops allocated to each community is established in step 644. Initially this number will be a fixed number of stores as determined by the on-line mall. However, as the community is developed, the number of shops can be increased or decreased to accommodate merchants who wish to become involved in a certain community.

Next in step 648, the on-line mall provides a common facade for all stores within a given community. Each merchant has the ability to personalize its store; however, at the community level, all stores within a community may have a similar look, thus allowing for an aesthetic flow of the storefronts in a given community as can be seen in an actual mall.

Next in step 650, a discussion area is provided. The discussion area includes forums limited to merchants, merchant and customer forums, or customer exclusive forums. This allows the merchant or customer to share information with other merchants or customers concerning the merchandise available or successful and unsuccessful merchant strategies. Thus, the on-line mall will prepare the discussion area, allowing the customers or merchants to create their own discussion groups to address certain issues.

Next in step 652, the invoice data collection storage is provided. A standard purchasing invoice is provided, allowing the on-line mall to use one form to collect all purchasing data from the various customers and submit that standard form to the various merchants to place the customer's order. The process ends in step 654. One skilled in the art will recognize that the order of the elements of FIG. 7 may be altered or that certain elements may be added or deleted from the process without detracting from the spirit of the invention.

Figure 8:
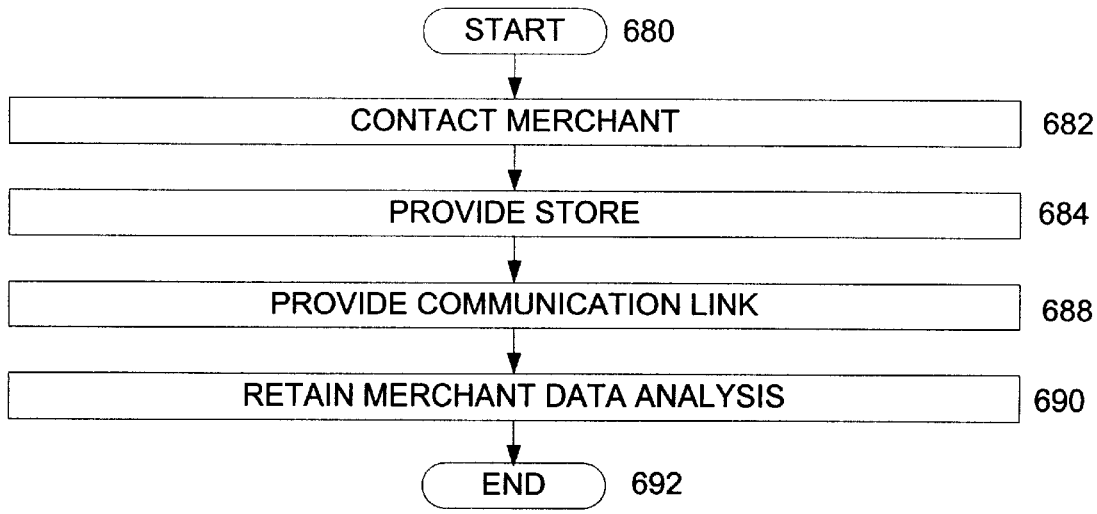
FIG. 8 is a flow diagram of the merchant store space element of FIG. 6.

Referring now to FIG. 8, a flow chart of the merchant store space process is shown. The process begins with Start, 680. Next, in step 682, the merchant is contacted. The on-line mall contacts merchants through a variety of means, including directly contacting specific merchants or by providing an open enrollment in which small "Mom and Pop" stores may apply. A mix of large and small retailers may be included within the mall. Once the merchant has been contacted in step 682 and has expressed interest in establishing a store in the mall, a store is provided in step 684. The merchant creates a store on the on-line mall computer rather than a hot link to the merchant's website. Thus, the merchant creates its store look and provides the necessary data to include all merchandise the merchant wishes to include in this store. All store design data and all merchandise data is stored on the on-line mall's computer 112. The merchant then updates the merchandise available on the merchant's store on the on-line mall website by removing or replacing data stored on the on-line mall's computer 112.

The on-line mall store is viewed as a separate store of the overall merchant's store that may be available on a different website than the on-line mall. Thus, the on-line store includes a subset of the merchandise available from the merchant. Next in step 686 a communication link is established between the on-line mall and the merchant's computer 128. The merchant provides the on-line mall with access to the merchant's purchasing computer system thus allowing the purchasing data to be submitted from the on-line mall to the merchant's computer over a secured communication line.

Next in step 690, merchant specific data is retained. The merchant specific data includes specific data which the merchants request the on-line mall to collect, including by way of example the customer specific data of what type of customer is buying what type of merchandise, when he/she is buying it, at which communities he/she is buying it from, at which stores in which communities he/she is buying from, and the dollar value a customer at a specific economical level is spending. The process ends at step 692.

Figure 9:
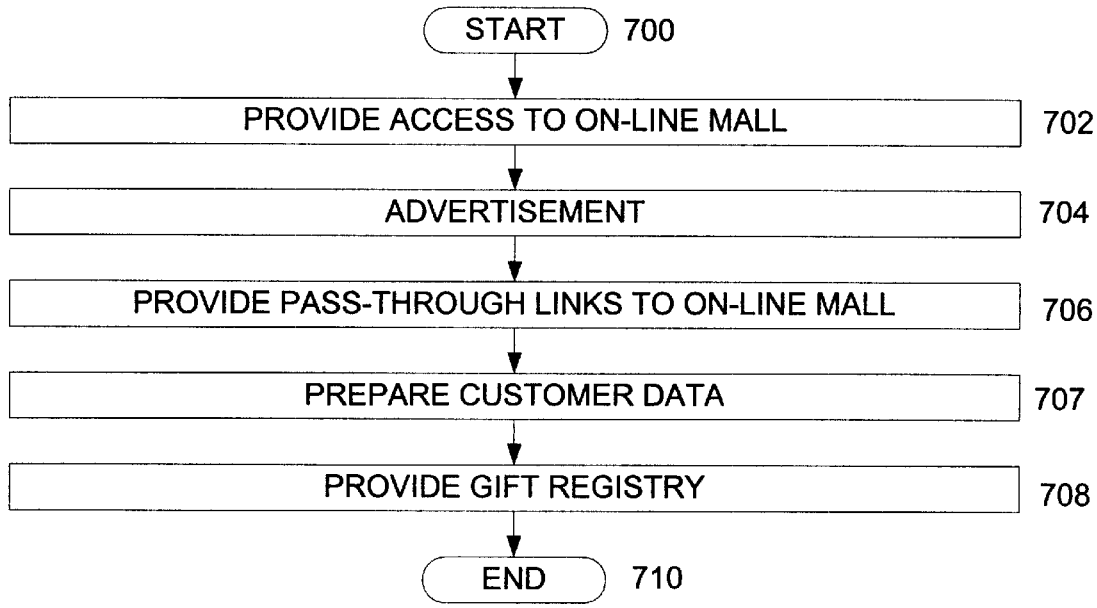
FIG. 9 is a flow diagram of the customer access element of FIG. 6.

Referring now to FIG. 9, a flow chart of the customer access process is shown. The process begins with step 700. Next in step 702 access to the on-line mall website is provided. To access the on-line mall website, the customer uses a computer system which allows the customer to remotely connect to the on-line mall website and to interact with the information provided by the on-line mall website.

Next in step 704, the on-line mall provides advertisement. The on-line mall provides advertisement in local media regarding the on-line mall or a specific community of the on-line mall, advertising in national media, such as advertising in a teen magazine that a teen community is available on the on-line mall, and further specifying and advertising particular merchandise that a merchant has requested to be advertised by the on-line mall.

Next in step 706, the on-line mall provides the customer with access to the mall through the creation of hot links on other websites. The other website, such as a portal, is another Internet website, which is not directly related to on-line mall, but includes a hot link to the on-line mall website. Once that hot link is selected by the customer from the other website, the customer's computer is directed toward the Internet address of the on-line mall.

Next in step 707 customer data is prepared. When the customer accesses the on-line mall website customer demographic information is collected. However, the customer may enter name, address, age, sex, and other demographic information including payment information only after merchandise is selected for purchase. This information may be entered after the customer selects merchandise from various merchants in various communities. Next, in step 708, a customer gift registry is prepared. A gift registry allows a registrant customer to select merchandise from the various merchants within one or more communities. The selected merchandise is stored and viewed by other customers who would like to purchase the merchandise for the registrant customer, such as for an upcoming event, such as a wedding, birthday, or impending birth. The on-line gift registry functions in a manner similar to a common gift registry available at a merchant's stores but with broader applicability. For example, in the prior art, if a customer wishes to have particular baby merchandise selected and purchased for the customer for an impending baby shower, the customer must go to a specific merchant and fill out a gift registry for that merchant. However, the on-line mall allows a registrant customer to select specific merchandise throughout a wide variety of merchants, including those contained in one community or those contained in multiple communities. Therefore, a second customer can enter the on-line mall, review in a single registry the merchandise selected by the registrant customer offered by different merchants at different communities without having to access multiple merchants' stores and reviewing multiple registries. A customer is not required to enter the gift registry either to register his selection or to view a prior customer's selections; however, the option is available. The process ends with step 710. One skilled in the art will recognize that the order of the elements in FIG. 9 may be altered, or that certain elements may be added or deleted without detracting from the spirit of the invention.

Figure 10:
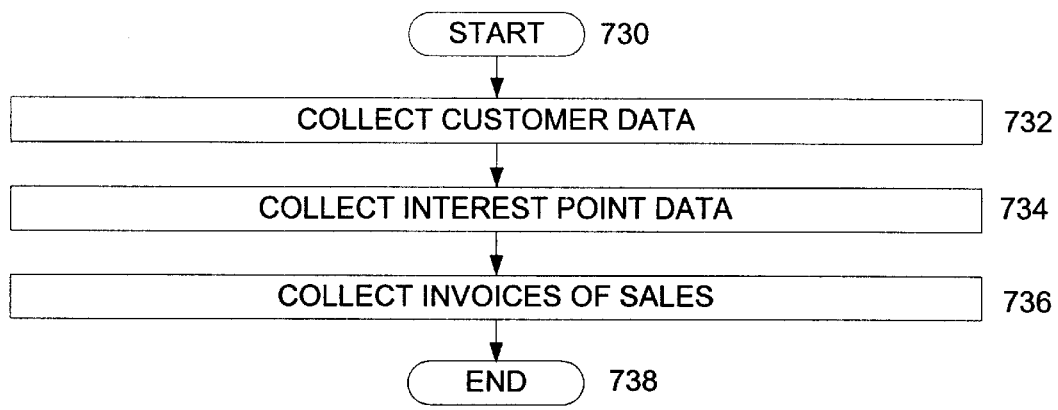
FIG. 10 is flow diagram of the customer data and purchase data collection of FIG. 6.

Referring now to FIG. 10, the process for retention of customer data and purchase data is shown. The process starts with step 730. Next, with step 732, customer specific information is collected. As the customer moves through the on-line mall website, accessing various communities and various merchants within each community, statistical information is stored so that the merchants may view who is accessing which stores in which communities and which stores are attracting the most attention. Next in step 734, further data interest points are collected. Thus, if a customer selects a particular item within a store or responds to a particular advertisement within a merchant's store, this information is stored and made available to the merchant for his review. Merchant specific data is not shared with other merchants which are resident within the on-line mall. However, historical data containing the average or aggregate access to specific locations or promotional advertisements may be provided to the merchants.

Next in step 736, after the customer has completed the visit to the on-line mall's website, all items selected for purchase are collected and stored in the appropriate servers. Once the customer has completed the selection of merchandise, the customer enters the purchase data such as age, name, address, and credit card number. Thus, the customer may enter the purchasing data one point of time, such as at the end of the purchasing visit. The process ends with step 738.

Figure 11:
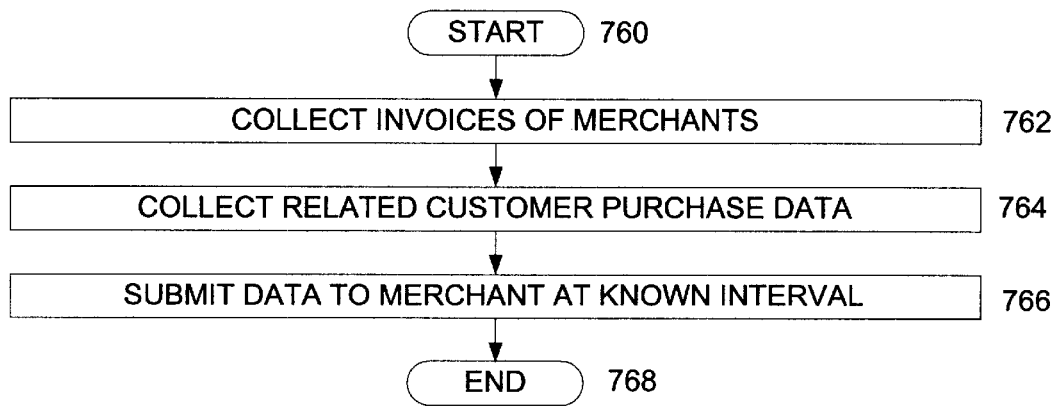
FIG. 11 is a flow diagram of the merchant purchase and customer data submittal of FIG. 6.

Referring to FIG. 11, the merchant purchase order submittal process is shown. The process begins with Start in step 760. Next in step 762, all purchases made from a particular merchant since the previous submittal of purchase information to the merchant are collected. Thus, if a merchant is updated daily, purchases by customers for the previous day are collected.

Next, in step 764, customer historical data for a particular merchant are collected and provided to the merchant at a standard interval, such interval including hourly, daily, weekly, or monthly submittals. Thus, if a particular advertisement within a store has been viewed by a certain number of customers, then the merchant obtains that information from the on-line mall website at the standard intervals.

Next in step 766, collected purchase data is submitted to the merchant. The purchase date is submitted to the merchant at a standard interval, which may vary from real-time to hourly to daily to weekly or longer. However, an interval which is almost instantaneous with the selection of purchases may be available and does not detract from the spirit of the invention. The process ends in step 768.

FIGS. 12A–12D show a flow diagram of the shopping process at the on-line mall. The process begins with start 800 in FIG. 12A. Next, the website is initiated in step 802. The website is initiated by executing a program(s) stored on the on-line mall computer 112 and by connecting the on-line mall computer 112 to communication lines 134 and 136. Next, in step 804, access of the on-line mall website is provided. If the on-line mall website has not been accessed, then the initiation program continues to monitor for future access. If the website has been accessed, then different options are displayed in step 806, such as search engine, advertisements, browsing options, and gift registry options. The search engine, advertisements, browsing options, and gift registry options are show in the home page or initial page of the on-line mall website. Next, whether any of the stated functions are accessed is monitored. The different options are in the figure as being accessed in sequential order, however one skilled in the art will recognize that the order of the options may be changed, certain options may be added or deleated, or access to the options may be offered concurrently at the same stage, none of which would detract from the spirit of the invention.

Figure 12A:
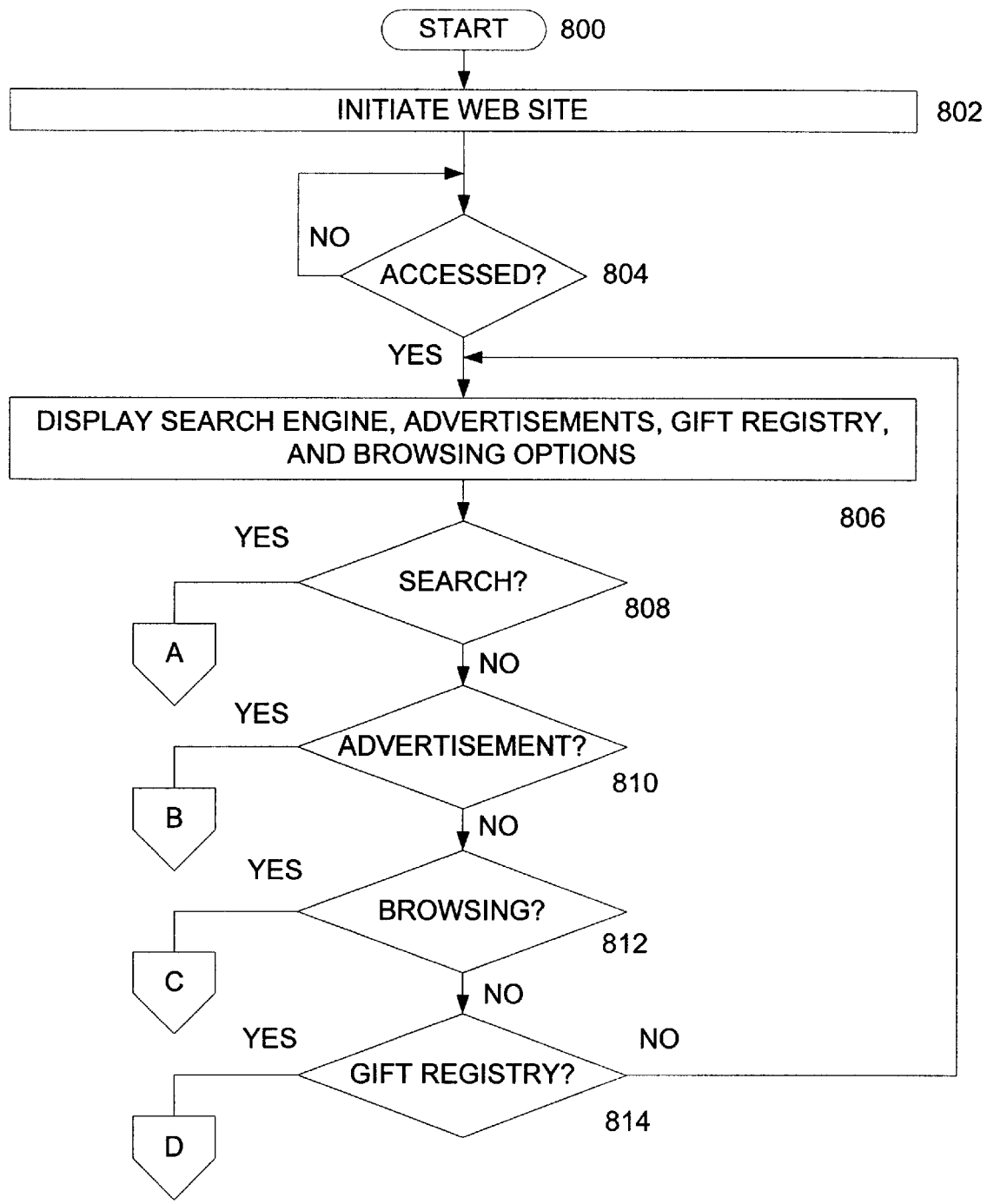
FIGS. 12A–12D are flow diagrams of the shopping process at the on-line mall.
Figure 12B:
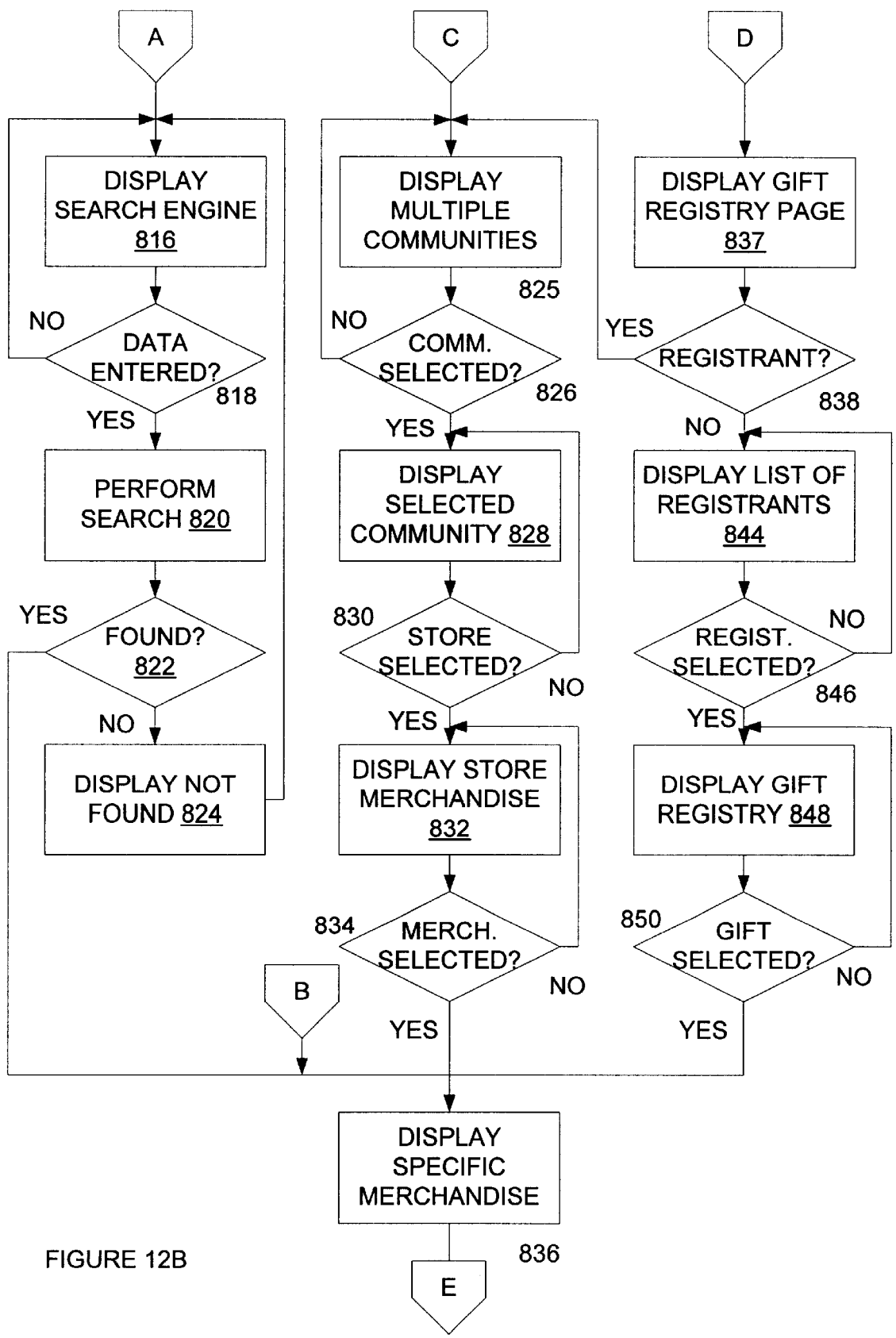

If a search engine is selected in step 808, then the search engine display page is shown in step 816 in FIG. 12B. The search engine allows for the customer to enter specific data or other such information into a searching program which compares the information contained on the on-line website with the specific data. Those skilled in the art will understand that a wide variety of search engines are available. Once entry of data into the search engine is determined in step 818 the search for the specific product or other information is shown in step 820. If the specific information is not found on the website in step 822, then the not found display will be shown in step 824 before returning the customer to the initial search engine display in step 816. If the product is found in step 822 then the specific merchandise requested is displayed in step 836.

If the customer selects step 810 the advertisement in FIG. 12A being displayed on the home page website of the on-line mall, then the specific merchandise displayed in the advertisement is displayed in step 836 in FIG. 12B.

If the customer selects to browse the website in step 812 in FIG. 12A, then the list of communities is displayed in step 825 in FIG. 12B. Once a community is selected in step 826, that community is displayed in step 828. By displaying the community in step 828, the multiple stores within that community are shown. Once a specific store is selected in step 830, the specific store's merchandise is displayed in step 832. If specific merchandise is not selected, then the store merchandise is continued to be displayed in step 832. However, if specific merchandise is selected in step 834, then the specific merchandise is displayed in step 836.

If upon entry into the on-line mall home page the customer selects to enter the gift registry in step 814 in FIG. 12A, the gift registry page is displayed in step 837 in FIG. 12B. Whether the customer is a registrant is determined in step 838. A registrant is a customer wishing to register a series of gifts for a specific occurrence, such as a wedding, impending birth, or birthday. Once the customer has selected to register, the list of communities is displayed in step 825, and the customer selects which community he would like to enter in step 826. While the customer is in the gift registry process, the customer selects products as if the customer were intending to buy the products as described previously, however, at the end of the purchasing visit the customer is given the option of creating the gift registry instead of purchasing the merchandise. This process functions substantially as the browsing and purchasing discussed herein.

If the customer is not a registrant, in step 838, then the list of registrants is displayed in step 844. The list of registrants continues to be displayed until a registrant is selected in step 846. Once the registrant has been selected in step 846, the merchandise selected by the registrant is displayed in step 848. Along with the merchandise selected by the registrant, other information may be displayed, such as the price of the merchandise, whether or how much of the merchandise has been purchased, the name of the purchaser, and whether the purchaser has requested that the merchandise be sent directly to the registrant. The merchandise the registrant has selected continues to be displayed until the customer selects specific merchandise to be viewed, in step 850. Once the customer has selected the specific merchandise to be viewed, the specific merchandise is displayed in step 836.

Figure 12C:
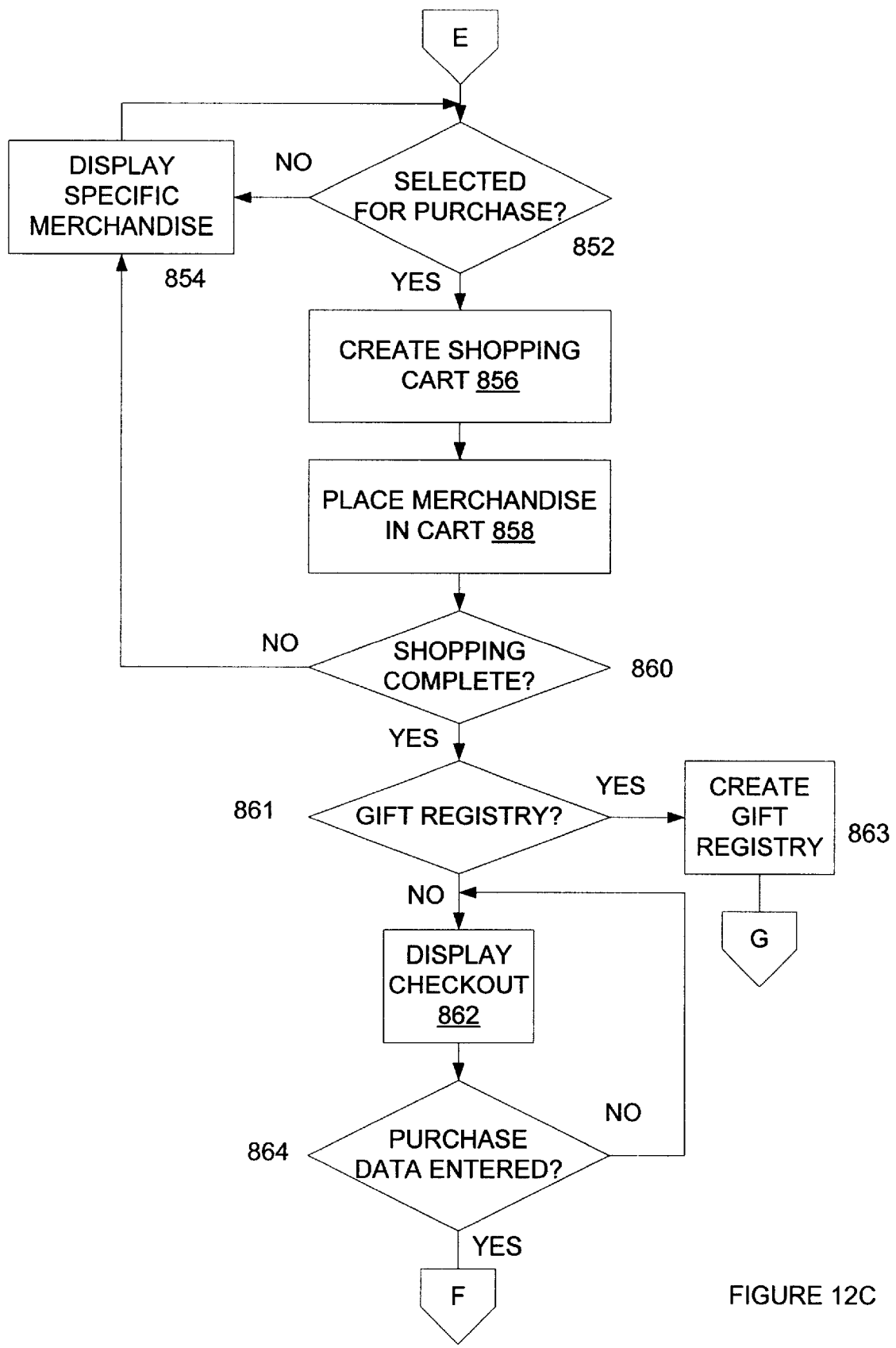

Next, in step 852 in FIG. 12C, whether the customer has selected the specific merchandise for purchase is shown. If the merchandise is not selected for purchase, the specific merchandise is continued to be displayed in step 854. In step 852, if the merchandise is selected for purchase or for entry into a gift registry if the customer is a registrant, then the shopping cart or gift registry is created in step 856. The specific merchandise is placed in the shopping cart or gift registry in step 858. A customer then returns to the specific store or community using methods known to those skilled in the art including selecting the "Back" key of the web browser or by specifically selecting a previously viewed website URL.

If a customer has completed his shopping in step 860, then whether the customer wishes to purchase the merchandise or create the registry is determined in step 861. If the customer desires to create a registry in step 861, then the registry is created in step 863 before proceeding to end 872. If the customer desires to purchase the merchandise, then the check out is displayed in step 862.

Figure 12D:
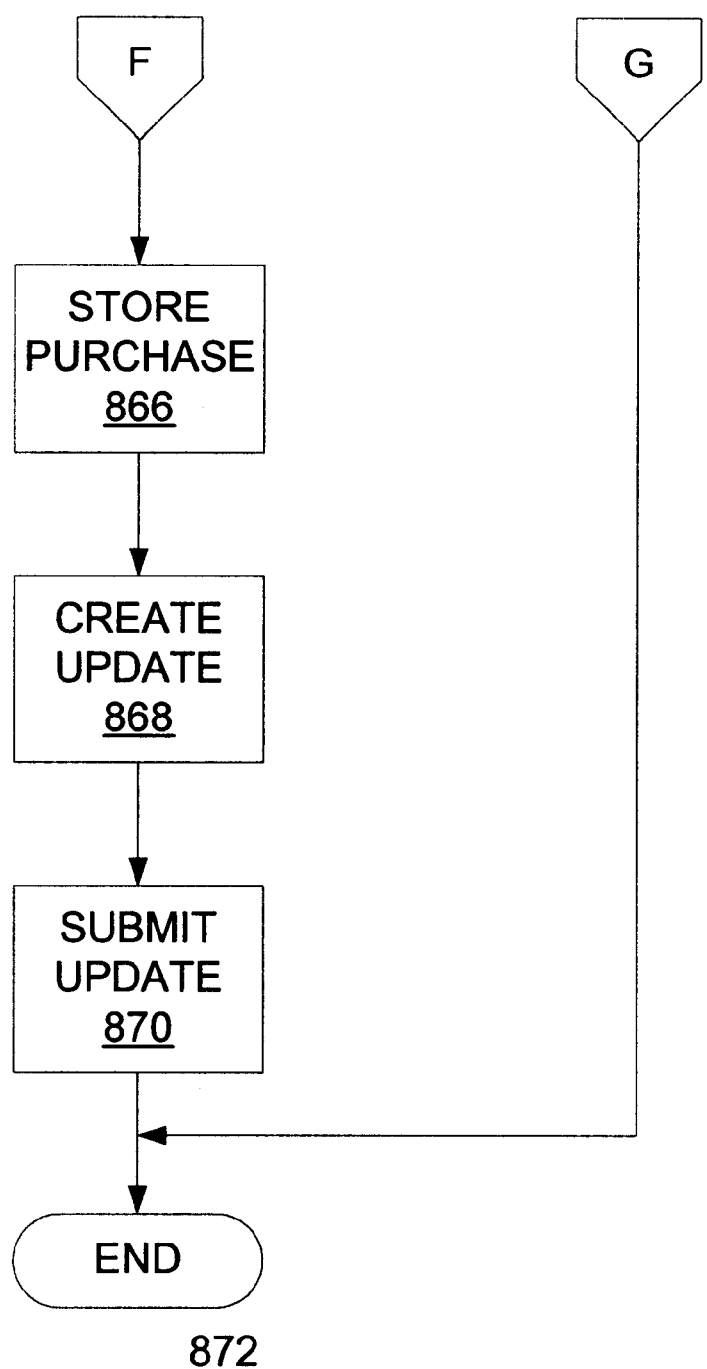

Once the purchase data is entered in step 864, then the purchase is stored in step 866 in FIG. 12D. At the end of the update interval, as discussed herein, the specific merchant update is created in step 868. Next, in step 870 the update is submitted to the specific merchant in step 870 the process ends with step 872.

The foregoing disclosure and description of the invention are illustrative and explanatory thereof and various changes to the size, shape, materials, components, order may be made without departing from the spirit of the invention.

What is claimed is:

1. A method for providing an on-line mall to two or more customers, the method comprising the steps of:
providing a mall environment on-line, the mall environment including a data storage device;
providing two or more stores within the mall environment, where each store is associated with one of two or more communities;
providing customer access to the two or more stores;
providing a discussion forum for the customers;
providing a plurality of gift registries, where each gift registry is associated with at least one of any store of any community within the on-line mall;
providing access to each gift registry o one or more registrants, so that the registrant can select one or more gifts for We gift registry;
receiving purchase data from the customer for each of the two or more stores based on data received by the customers from the discussion forum and the gift registry; and
processing the purchase data through a single system.

2. The method of claim 1 wherein the step of providing a mall environment includes partitioning the mall into at least one community.

3. The method of claim 2 wherein the step of partitioning the mall into at least one community includes at least one store in each community.

4. The method of claim 3 wherein the step of providing at least one store in each community includes providing a common facade for each store within a community.

5. The method of claim 1 wherein the step of providing a discussion forum includes providing a merchant discussion forum.

6. The method of claim 1 wherein the step of providing a store includes providing a store for use by a merchant.

7. The method of claim 6 wherein the step of providing a store for use by a merchant includes providing storage area to place store design data and merchandise data.

8. The method of claim 1 wherein the step of providing a store includes providing a communication link to a merchant.

9. The method of claim 1 wherein the step of providing a store includes providing merchant specific data collection.

10. The method of claim 1 wherein the step of providing customer access includes providing access from a remote location.

11. The method of claim 1 wherein the step of providing customer access includes providing advertisement of the on-line mall.

12. The method of claim 11 wherein the step of providing advertisement of the on-line mall includes advertising in publications.

13. The method of claim 11 wherein the step of providing advertisement of the on-line mall includes advertising in audio media.

14. The method of claim 1 wherein the step of providing customer access includes providing links to the on-line mall from a website.

15. The method of claim 1 wherein the step of storing customer data includes storing customer's purchase selections.

16. The method of claim 15, wherein the step of storing customer's purchase selections include storing customer's purchase selections from multiple stores.

17. The method of claim 16, wherein the step of storing customer's purchase selections from multiple stores includes storing customer credit information once for the selections from multiple stores.

18. The method of claim 1 wherein the step of storing customer data includes storing customer's movements within the on-line mall.

19. The method of claim 18 wherein the step of sending the merchant specific purchase requests includes sending all purchase requests for the specific merchant.

20. The method of claim 1 wherein the step of storing customer data includes storing merchant specific points of interest.

21. The method of claim 1 wherein the step of sending the customer data to a merchant includes sending the merchant specific purchase requests.

22. The method of claim 21 wherein the step of sending the customer data to a merchant on a stated interval includes sending the customer data on a daily interval.

23. The method of claim 1 wherein the step of sending the customer data to a merchant includes sending the customer data to a merchant on a stated interval.

24. The method of claim 1 wherein the step of sending the customer data to a merchant includes sending the merchant specific historical data.

\* \* \* \* \*

UNITED STATES PATENT AND TRADEMARK OFFICE
CERTIFICATE OF CORRECTION

PATENT NO.   : 6,556,975 B1
DATED        : April 29, 2003
INVENTOR(S)  : L. William Wittsche It is certified that error appears in the above-identified patent and that said Letters Patent is hereby corrected as shown below:

Column 12,
Line 20, replace "We", with -- the --.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,556,975 B1
DATED         : April 29, 2003
INVENTOR(S)   : L. William Wittsche It is certified that error appears in the above-identified patent and that said Letters Patent is hereby corrected as shown below:

Title page,
Item [56], References Cited, OTHER PUBLICATIONS, delete
").'' before 2$^{nd}$ "Hayes".
Item [57], ABSTRACT,
Line 15, delete "mechant" and insert -- merchant --, therefor.

Column 1,
Line 32, delete "retailers" and insert -- retailer's --, therefor.

Column 10,
Line 38, delete "show in" and insert -- shown on --, therefor.
Line 41, after "are" insert -- show --, therefor.

Column 11,
Line 22, after "visit" insert -- , --.

Column 12,
Line 18, after "registry" delete "o" and insert -- to --, therefor.

Signed and Sealed this

Sixth Day of December, 2005

JON W. DUDAS
*Director of the United States Patent and Trademark Office*